US008363850B2

(12) United States Patent
Amada

(10) Patent No.: US 8,363,850 B2
(45) **Date of Patent: *Jan. 29, 2013**

(54) AUDIO SIGNAL PROCESSING METHOD AND APPARATUS FOR THE SAME

(75) Inventor: Tadashi Amada, Yokohama (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 1208 days.

This patent is subject to a terminal disclaimer.

(21) Appl. No.: 12/135,300

(22) Filed: Jun. 9, 2008

(65) Prior Publication Data

US 2008/0310646 A1 Dec. 18, 2008

(30) Foreign Application Priority Data

Jun. 13, 2007 (JP) ................................. 2007-156584

(51) Int. Cl.
*H04B 15/00* (2006.01)

(52) U.S. Cl. ..................... 381/94.7; 381/94.2; 381/94.3; 381/92; 704/226; 704/233

(58) Field of Classification Search .............. 381/91–92, 381/122, 94.1, 94.3, 94.7, 73.1; 704/224, 704/233, 226, 200.1, 225, 227, 228
See application file for complete search history.

(56) References Cited

U.S. PATENT DOCUMENTS

| | | | | |
|---|---|---|---|---|
| 5,602,962 | A * | 2/1997 | Kellermann | 704/226 |
| 7,454,023 | B1 * | 11/2008 | Belt et al. | 381/92 |
| 7,554,023 | B2 * | 6/2009 | Tyler | 84/313 |
| 2003/0028372 | A1 * | 2/2003 | McArthur et al. | 704/220 |

FOREIGN PATENT DOCUMENTS

| | | | |
|---|---|---|---|
| CN | 1893461 | A | 1/2007 |
| JP | 2004-289762 | A | 10/2004 |
| JP | 2005-260743 | A | 9/2005 |
| JP | 2007010897 | | 1/2007 |

OTHER PUBLICATIONS

Search report dated Sep. 11, 2010 (with English translation) from corresponding Chinese Patent Appln No. 200810110134.3.
Knapp, et al. "The Generalized Correlation Method for Estimation of Time Delay", IEEE Transactions on Acoustics, Speech, and Signal Processing, pp. 320-327, vol. ASSP-24, No. 4, Aug. 1976.
Steven F. Boll, "Suppression of Acoustic Noise in Speech Using Spectral Subtraction", IEEE Transactions on Acoustics, Speech, and Signal Processing, pp. 113-120, vol. ASSP-27, No. 2, Apr. 1979.
Ephraim, et al. "Speech Enhancement Using a Minimum Mean-Square Error Short-Time Spectral Amplitude Estimator", IEEE Transactions on Acoustics, Speech, and Signal Processing, pp. 1109-1121, vol. ASSP-32 No. 6, Dec. 1984.
Ephraim, et al. "Enhancement Using a Minimum Mean-Square Error Log-Spectral Amplitude Estimator", IEEE Transactions on Acoustics, Speech, and Signal Processing, pp. 443-445, vol. ASSP-33 No. 2, Apr. 1985.
Search report dated Oct. 6, 2009 from corresponding Japanese Patent Appln No. 2007-156584.

* cited by examiner

*Primary Examiner* — Disler Paul
(74) *Attorney, Agent, or Firm* — Ohlandt, Greeley, Ruggiero & Perle, L.L.P.

(57) ABSTRACT

An audio signal processing method for processing input audio signals of plural channels includes calculating at least one feature quantity representing a difference between channels of input audio signals, selecting at least one weighting factor according to the feature quantity from at least one weighting factor dictionary prepared by learning beforehand, and subjecting the input audio signals of plural channels to signal processing including noise suppression and weighting addition using the selected weighting factor to generate output an output audio signal.

12 Claims, 13 Drawing Sheets

AUDIO SIGNAL PROCESSING METHOD AND APPARATUS FOR THE SAME

CROSS-REFERENCE TO RELATED APPLICATIONS

This application is based upon and claims the benefit of priority from prior Japanese Patent Application No. 2007-156584, filed Jun. 13, 2007, the entire contents of which are incorporated herein by reference.

BACKGROUND OF THE INVENTION

1. Field of the Invention

The present invention relates to an audio signal processing method for producing a speech signal obtained by emphasizing a target speech signal of an input audio signal and an apparatus for the same.

2. Description of the Related Art

When a speech recognition technology is used in actual environment, ambient noise exercises great influence on a recognition rate. In a car interior, for example, there are many noises other than a speech, such as an engine sound of a car, wind noise, a sound of an oncoming car and a forereaching car, and a sound of car audio equipment. These noises are mixed in a speech of a speaker, and are input to a speech recognizer, causing a recognition rate to decrease greatly.

One method for solving a problem of such a noise is utilization of a microphone array which is one of noise suppression techniques. The microphone array is a system for signal-processing audio signals input from plural microphones to output an emphasized target speech. A noise suppression technique using the microphone array is effective in a hands free device.

Directivity is one of characteristics of noise in acoustic environment. For example, a voice of an interfering speaker is quoted as a directivity noise and has a characteristic that an arrival direction of noise is perceivable. On the other hand, non-directivity noise (as referred to as diffuse noise) is noise whose arrival direction is not settled in a specific direction. In many cases, the noise in actual environment has an intermediate character between the directivity noise and the diffuse noise. An engine sound may be heard generally in the direction of an engine room, but it does not have a strong directivity capable of specifying to one direction.

Since the microphone array performs noise suppression by using a difference between arrival times of audio signals of plural channels, great noise suppression effect for the directivity noise can be expected even by few microphones. On the other hand, the noise suppression effect is not great for the diffuse noise. For example, the diffuse noise can be suppressed by synchronous addition, but a number of microphones are necessary for a sufficient noise suppression to be obtained, so that the synchronous addition is distant.

Further, there is a problem of sound reverberation in actual environment. The sound emitted in closed space is observed by being reflected back in wall surfaces many times due to sound reverberation. Therefore, a target signal is to come from a direction different from an arrival direction of a direct wave to a microphone, so that the direction of a sound source becomes unstable. As a result, there is a problem that suppression of directivity noise by the microphone array becomes difficult and also the signal of target speech to be not suppressed is partially eliminated as the directivity noise. In other words, a problem of "target speech elimination" occurs.

JP-A 2007-10897 (KOKAI) discloses a microphone array technique under such sound reverberation. The filter coefficient of the microphone array, which includes influence of sound reverberation in acoustic environment assumed beforehand, will be learned. In actual use of the microphone array, the filter coefficient is selected based on a feature quantity derived from an input signal. In other words, JP-A 2007-10897 (KOKAI) discloses a technique of so-called learning type array. This method can suppress enough the directivity noise in the sound reverberation, and avoid the problem of "target speech elimination" too. However, the prior art disclosed in JP-A 2007-10897 (KOKAI) cannot suppress the diffuse noise using the directivity. The noise suppression effect is not enough even if using the technique disclosed in JP-A 2007-10897 (KOKAI).

The present invention is directed to enabling emphasis of a target speech signal by a microphone array while suppressing diffuse noise.

BRIEF SUMMARY OF THE INVENTION

An aspect of the present invention provides an audio signal processing method for processing input audio signals of plural channels, comprising: calculating at least one feature quantity representing a difference between channels of input audio signals; selecting weighting factors according to the feature quantity from at least one weighting factor dictionary prepared by learning beforehand; and subjecting the input audio signals of plural channels to signal processing including noise suppression and weighting addition using the selected weighting factor to generate output an output audio signal.

DETAILED DESCRIPTION OF THE INVENTION

There will be explained an embodiment of the present invention, hereinafter.

Figure 1:
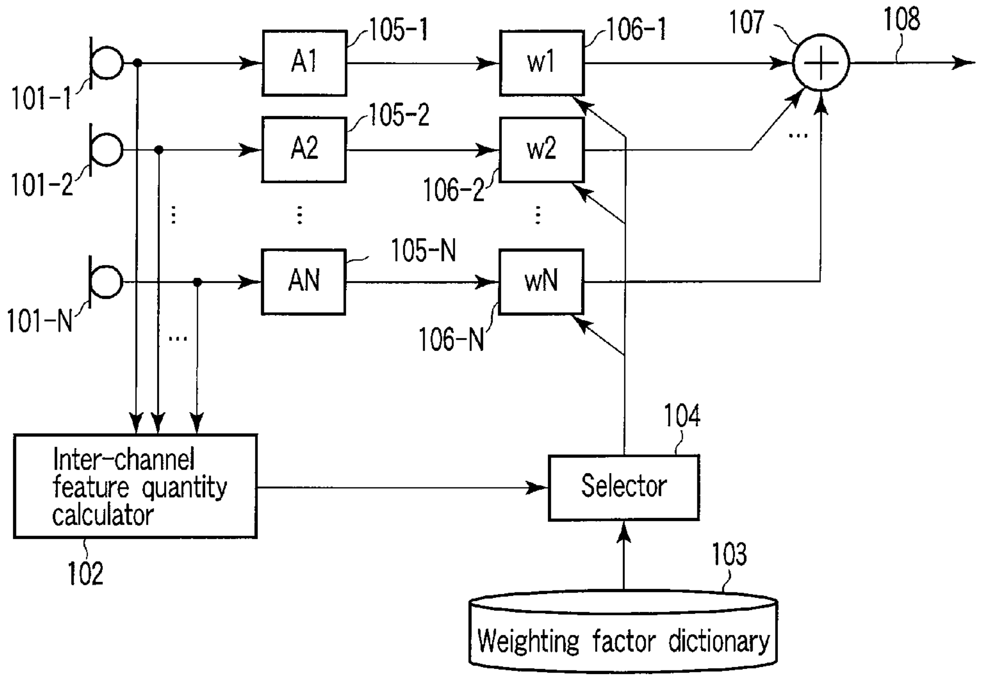
FIG. 1 is a block diagram of an audio signal processor according to a first embodiment.

In an audio signal processing apparatus according to the first embodiment as shown in FIG. 1, input audio signals of N channels from plural (N) microphones 101-1 to 101-N are input to an inter-channel feature quantity calculator 102 and noise suppressors 105-1 to 105-N. The inter-channel feature quantity calculator 102 calculates a feature quantity (referred to as an inter-channel feature quantity) representing a difference between the channels of the input audio signals and send it to a selector 104. The selector 104 selects weighting factors corresponding to the inter-channel feature quantity from a number of weighting factors (referred to as array weighting factors) stored in a weighting factor dictionary 103.

The noise suppressors 105-1 to 105-N subject the input audio signals of N channels to a noise suppression process, in particular, a process for suppressing diffuse noise. The noise-suppressed audio signals of N channels from the noise suppressors 105-1 to 105-N are weighted by the weighting factor selected with the selector 104 with weighting units 106-1 to 106-N. The weighted audio signals of N channels from the weighting units 106-1 to 106-N are added with an adder 107, to produce an output audio signal 108 wherein the target speech signal is emphasized.

Figure 2:
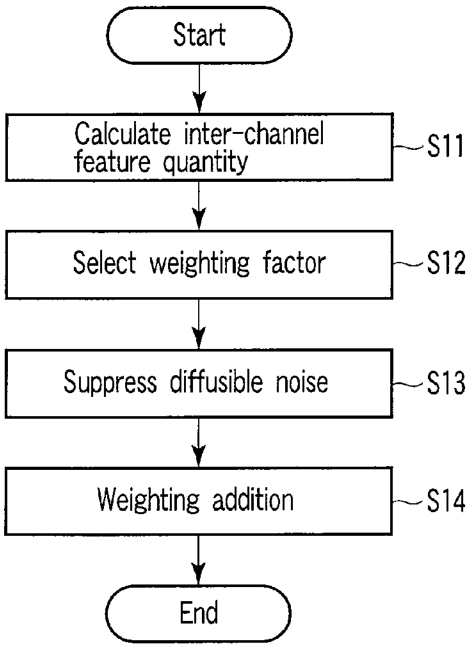
FIG. 2 is a flow chart illustrating a process procedure of the first embodiment.

The processing routine of the present embodiment is explained according to the flow chart of FIG. 2. The inter-channel feature quantity is calculated from the input audio signals (assumed to be x1 to xN) output by the microphones 101-1 to 101-N with the inter-channel feature quantity calculator 102 (step S11). When a digital signal processing technology is used, the input audio signals x1 to xN are digital signals digitized along a time axis with an analog-to-digital converter (not shown), and expressed by x(t) using a time index t. If the input audio signals x1 to xN are digitized, the inter-channel feature quantity is digitized, too. For a concrete example of the inter-channel feature quantity, a difference between arrival times of the input audio signals x1 to xN as described hereinafter, a power ratio, complex coherence or a generalized correlation function can be used.

The weighting factor corresponding to the inter-channel feature quantity is selected from the weighting factor dictionary 103 with the selector 104 based on the inter-channel feature quantity calculated in step S11 (step S12). In other words, the weighting factor selected from the weighting factor dictionary 103 is extracted. The correspondence between the inter-channel feature quantity and the weighting factor is determined beforehand. In most simple and easy way, there is a method of making the inter-channel feature quantity and the weighting factor correspond one on one. As a method of doing the more effective correspondence, there is a method of grouping the inter-channel feature quantities using a clustering method such as LBG and allocating a corresponding weighting factor to each group. A method of making the weight of distribution and the weighting factors w1 to wN correspond to each other using statistical distribution such as GMM (Gaussian mixture model) is conceivable. In this way, various methods are considered about the correspondence between the inter-channel feature quantity and the weighting factor, and an optimum method is determined in consideration of a calculation cost or a memory capacity. The weighting factors w1 to wN selected by the selector 104 in this way are set to the weighting units 106-1 to 106-N. The weighting factors w1 to wN generally differ in value from one another. However, they may have the same value accidentally, or all of them may be 0. The weighting factors are determined by learning beforehand.

On the other hand, the input audio signals x1 to xN are sent to the noise suppressors 105-1 to 105-N to suppress the diffuse noise thereby (step S13). The audio signals of N channels after noise suppression are weighted according to the weighting factors w1 to wN with the weighting units 106-1 to 106-N. The weighted audio signals are added with the adder 107 to produce an output audio signal 108 wherein a target speech signal is emphasized (step S14).

The inter-channel feature quantity calculator 102 is described in detail hereinafter. The inter-channel feature quantity is a quantity representing a difference between the input audio signals x1 to xN of N channels from N microphones 101-1 to 101-N as described before. There are the following various quantities as described in JP-A 2007-10897 (KOKAI), the entire contents of which are incorporated herein by reference.

The case that the arrival time difference $\tau$ between the input audio signals x1 to xN is N=2 is assumed. When the input audio signals x1 to xN arrive from the front of the array of microphones 101-1 to 101-N, $\tau=0$. When the input audio signals x1 to xN arrive from the position shifted by an angle $\theta$ with respect to the front, the delay of $\tau=d \sin \theta/c$ occurs, where c is a sound speed, and d indicates a distance between the microphones 101-1 to 101-N.

Assuming that the arrival time difference $\tau$ can be detected, only the input audio signal from the front of the microphone array can be emphasized by corresponding a weighting factor relatively large with respect to $\tau=0$, for example, (0.5, 0.5) to the inter-channel feature quantity, and by corresponding a weighting factor relatively small with respect to a value other than $\tau=0$, for example, (0, 0) to the inter-channel feature quantity. Assuming that $\tau$ is digitized, a unit of time corresponding to the minimum angle which can be detected by the array of microphones 101-1 to 101-N may be determined. There are various methods such as a method of setting a time corresponding to an angle changing in units of a constant angle such as in units of one degree or a method of using a constant time interval regardless of the angle.

Generally most of conventional microphone arrays obtain their output signals by weighting an input audio signal from each microphone and adding weighted audio signals. There are various systems of microphone array, but basically a method for determining a weighting factor w differs between the systems. An adaptive microphone array often obtains an analytical weighting factor w. DCMP (Directionally Constrained Minimization of Power) is known as one of such adaptive microphone arrays.

Since DCMP obtains a weighting factor based on the input audio signal from a microphone adaptively, it can realize high noise suppression efficiency with fewer microphones in comparison with a fixed type array such as a delay sum array. However, because the direction vector c fixed beforehand and the direction to which a target sound actually arrives do not always coincide due to interference of acoustic wave under a sound reverberation, the problem of "target sound elimination" which a target audio signal is considered to be noise and thus is suppressed is cropped up. In this way, an adaptive array forming a directional pattern adaptively based on the input audio signal is influenced by sound reverberation remarkably, and thus the problem of "target sound elimination" is not avoided.

In contrast, the system which sets a weighting factor based on the inter-channel feature quantity according to the present embodiment, can avoid the target sound elimination by learning the weighting factor. For example, assuming that the audio signal emitted from the front of the microphone array is delayed by $\tau 0$ in the arrival time difference $\tau$ due to reflection, if the weighting factor corresponding to $\tau 0$ is increased relatively such as (0.5, 0.5), and a weighting factor corresponding to $\tau$ aside from $\tau 0$ is decreased relatively such as (0, 0), the problem of target sound elimination can be avoided. Learning of weighting factor, namely correspondence between the inter-channel feature quantity and the weighting factor when the weighting factor dictionary 103 is made is done beforehand by the following method. For example, a CSP (cross-power-spectrum phase) method is quoted as a method for obtaining the arrival time difference $\tau$. In the CSP method, a CSP coefficient is calculated for the case of N=2 by the following equation (1).

$$CSP(t) = IFT\frac{conj(X1(f)) \times X2(f)}{|X1(f)| \times |X2(f)|} \tag{1}$$

where CSP(t) indicates the CSP coefficient, Xn (f) indicates Fourier transformation of xn (t), IFT { } indicates inverse Fourier transformation, conj ( ) indicates a complex conjugate, and || indicates an absolute value.

Because the CSP coefficient is inverse Fourier transformation of white cross spectrum, it has a pulse-shaped peak in the time t corresponding to the arrival time difference $\tau$. Accordingly, the arrival time difference $\tau$ can be known by maximal value retrieval of the CSP coefficient.

For the inter-channel feature quantity based on the arrival time difference, it is possible to use complex coherence as well as the arrival time difference itself. Complex coherence of X1(f), X2(f) is expressed by the following equation (2).

$$Coh(f) = \frac{E\{conj(X1(f)) \times X2(f)\}}{\sqrt{E\{|X1(f)|^2\} \times E\{|X2(f)|^2\}}} \tag{2}$$

where Coh (f) is complex coherence, and E { } denotes time average. The coherence is used as a quantity representing relation between two signals in field of signal processing. As for the signal having no correlation between channels such as diffuse noise, the absolute value of coherence becomes small. As for the signal of directivity, the coherence becomes large. As for the signal of directivity, because a time difference between channels appears as a phase component of coherence, it can be distinguished by the phase whether it is a target audio signal from the target direction or whether it is a signal from a direction aside from the target direction. It is possible to distinguish the diffuse noise, target speech signal and directivity noise by using these properties as a feature quantity. As understood from the equation (2), the coherence is a function of frequency. Therefore, it is congenial to the third embodiment described hereinafter. However, when it is used in a time domain, various methods such as a method of averaging it in a frequency direction and a method of using a value of representative frequency are conceivable. The coherence is defined with N channels conventionally, which are not limited to N=2 in the present embodiment. It is general that the coherence of N channels is expressed in combination (N×(N−1)/2 at maximum) of coherences of any two channels.

A generalized cross correlation function as well as the feature quantity based on the arrival time difference can be used as the inter-channel feature quantity. The generalized cross correlation function is described in, for example, "The Generalized Correlation Method for Estimation of Time Delay, C. H. Knapp and G. C. Carter, IEEE Trans, Acoust., Speech, Signal Processing", Vol. ASSP-24, No. 4, pp. 320-327 (1976), the entire contents of which are incorporated herein by reference. The generalized cross correlation function GCC (t) is defined by the following equation.

$$GCC(t)=IFT\{\Phi(f)\times G12(f)\} \tag{3}$$

where IFT indicates inverse Fourier transformation, Φ(f) indicates a weighting factor, and G12(f) indicates a cross power spectrum between channels. There are various methods for deciding Φ(f) as described in the above document. For example, the weighting factor Φml(f) by a maximum likelihood estimation method is expressed by the following equation.

$$\Phi ml(f) = \frac{1}{|G12(f)|} \times \frac{|\gamma 12(f)|^2}{1-|\gamma 12(f)|^2} \tag{4}$$

where $|\gamma 12(f)|^2$ is an amplitude squared coherence.

As is the case with CSP, an intensity of correlation between channels and a direction of a sound source can be known from a maximal value of GCC (t) and t giving the maximal value.

In this way, according to the present embodiment, since relation between the inter-channel feature quantity and the weighting factors w1 to wN is obtained by learning, even if directional information of the input audio signals x1 to xN is disturbed by the sound reverberation, it is possible to emphasize the target speech signal without the problem of "target sound elimination".

The weighting units 106-1 to 106-N are explained in detail hereinafter. The weighting performed with the weighting units 106-1 to 106-N is expressed as convolution in digital signal processing in a time domain. In other words, when the weighting factor w1 to wN are expressed by wn={wn (0), wn (1), . . . , wn(L−1)}, the following relational expression (5) is established.

$$xn(t) * wn = \sum_{k=0}^{L-1} xn(t-k) * wn(k) \tag{5}$$

where L indicates a filter length, n indicates a channel number, and * indicates convolution.

An output audio signal 108 output from an adder 107 is expressed by y(t) as a total of all channels as shown in the flowing equation.

$$y(t) = \sum_{n=1}^{N} xn(t) * wn \tag{6}$$

The noise suppressors 105-1 to 105-N are explained in detail hereinafter. The noise suppressors 105-1 to 105-N can perform noise suppression by the similar convolution operation. A concrete noise suppression method will be described referring to a frequency domain, but a convolution operation in a time domain and a multiplication in a frequency domain have a relation of a Fourier transform. Therefore, the noise suppression can be realized in either the frequency or the time domain.

For methods of noise suppression there are various methods such as spectrum subtraction shown in S. F. Boll, "Suppression of Acoustic Noise in Speech Using Spectral Subtraction," IEEE Trans. ASSP vol. 27, pp. 113-120, 1979, the entire contents of which are incorporated herein by reference, MMSE-STSA shown in Y. Ephraim, D. Malah, "Speech Enhancement Using a Minimum Mean-Square Error Short-Time Spectral Amplitude Estimator", IEEE Trans. ASSP vol. 32, 1109-1121, 1984, the entire contents of which are incorporated herein by reference, and MMSE-LSA shown in Y. Ephraim, D. Malah, "Speech Enhancement Using a Minimum Mean-Square Error Log-Spectral Amplitude Estimator", IEEE Trans. ASSP vol. 33, 443-445, 1985, the entire contents of which are incorporated herein by reference. Noise suppression methods based on these algorithms can be chosen appropriately.

The technique to combine the microphone array processing with the noise suppression is well known. For example, a noise suppressor following an array processor is referred to as a post-filter, and various technique are discussed. On the other hand, a method of arranging a noise suppressor before an array processor is not used very much because a computation cost of the noise suppressor increases by times the number of microphones.

The method described in JP-A 2007-10897 (KOKAI) has an advantage capable of reducing a distortion caused by the noise suppressor because the weighting factor is obtained by learning. In other words, at the time of learning, such a weighting factor is learned in order to reduce a difference between weighting addition of an input signal containing a distortion caused by noise suppression and a target signal. Therefore, even if the computation cost increases, there is a merit that the noise suppressors 105-1 to 105-N can be arranged before the weighting adder (including the weighting units 106-1 to 106-N and adder 107) as in the present embodiment.

In this case, at first a configuration is conceivable that the inter-channel feature quantity is obtained after having done noise suppression and a weighting factor is selected based on this inter-channel feature quantity. However, there is a problem in this configuration which is usually conceivable. Since the noise suppressors can operate independently for each channel, the inter-channel feature quantity of the audio signal is disturbed after the noise is suppressed by the noise suppressor. For example, in the case that the power ratio between channels is assumed to be an inter-channel feature quantity, when a different suppression coefficient is applied to an audio signal for every channel, the power ratio changes before and after noise suppression. In contrast, the inter-channel feature quantity calculator 102 and noise suppressors 105-1 to 105-N are disposed as shown in FIG. 1 in accordance with the present embodiment to calculate an inter-channel feature quantity about an input audio signal before noise suppression. This configuration avoids the above problem.

Figure 3:
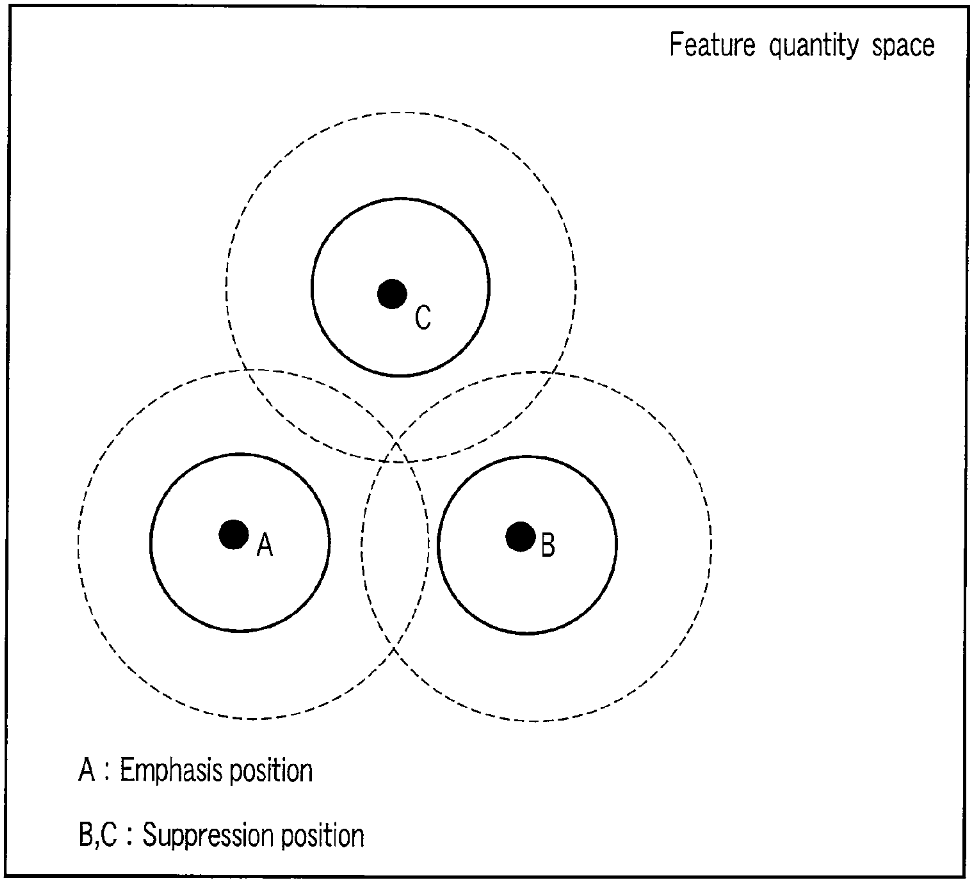
FIG. 3 is a diagram illustrating a distribution of channel feature quantity.

Referring to FIG. 3, an effect obtained by calculating the inter-channel feature quantity about the input audio signal before noise suppression in this way is described in detail. FIG. 3 shows schematically a distribution of the inter-channel feature quantity. In three audio source positions A, B and C assumed in a feature quantity space, A is assumed to be an emphasis position where a target signal arrives (for example, position of a front direction), and B, C are assumed to be positions at which a noise should be suppressed (for example, positions of the right and left courses).

The inter-channel feature quantity calculated in the environment where no noise exists is distributed over a narrow range for every direction as shown by black circles in FIG. 3. For example, when the power ratio is assumed to be an inter-channel feature quantity, the power ratio in the front direction is 1. Since the gain of the microphone which is near the sound source is slightly larger in the left direction or the right direction with respect to the sound source, the power ratio of one of the left and right directions is larger than 1, and that of the other direction is smaller than 1.

On the other hand, since the power of noise varies independently for every channel in the environment where noise exists, the dispersion of the power ratio between channels increases. This state is shown by solid circles in FIG. 3. When noise suppression is done for every channel, dispersion expands as shown by dotted circles. This is because the suppression coefficient is obtained in independence for every channel. In order for the microphone array processing of the rear stage to function effectively, it is desirable that a target direction and an interference direction can be distinguished from each other clearly at a stage of calculating the feature quantity.

In the present embodiment, when the inter-channel feature quantity is not calculated in the distribution (dotted circle) after having done noise suppression but it is calculated in the distribution (solid circle) before doing noise suppression, an expansion of distribution of inter-channel feature quantity due to noise suppression is avoided, and the array processor of rear stage can be functioned effectively.

Second Embodiment

Figure 4:
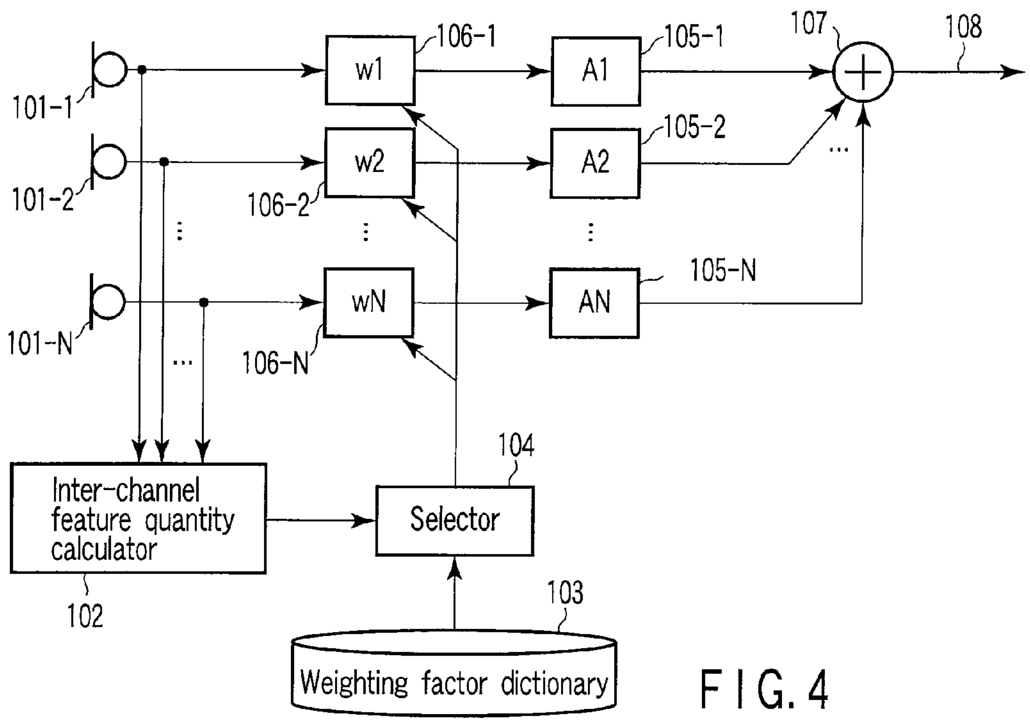
FIG. 4 is a block diagram of an audio signal processor according to a second embodiment.
Figure 5:
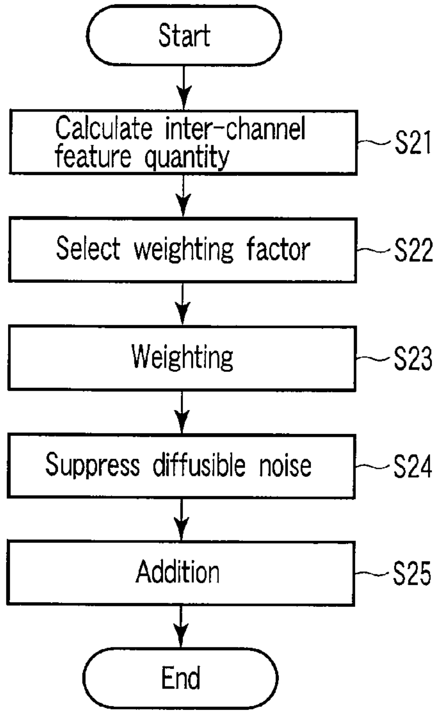
FIG. 5 is a flow chart illustrating a process procedure of the second embodiment.

FIG. 4 illustrates an audio signal processing apparatus according to the second embodiment. In this audio signal processing apparatus, the weighting units 106-1 to 106-N and noise suppressors 105-1 to 105-N are replaced with each other in position from those shown in FIG. 1. In other words, as shown in the flow chart of FIG. 5, the inter-channel feature quantities of the input audio signals x1 to xN of N channels are calculated with the inter-channel feature quantity calculator 102 (step S21), and the weighting factors corresponding to the calculated inter-channel feature quantities are selected with the selector 104 (step S22). In this way the steps S21 and S22 are similar to the steps S11 and S12 of FIG. 2.

In the present embodiment, next to the step S22, the input audio signals x1 to xN are weighted with the weighting units 106-1 to 106-N (step S23). The suppression of diffuse noise is performed on the weighted audio signals of N channels with the noise suppressors 105-1 to 105-N (step S24). At the last, the audio signals of N channels after noise suppression are added with the adder 107 to produce an output audio signal 108 (step S25).

In this way, which of a set of the noise suppressors 105-1 to 105-N and a set of the weighting units 106-1 to 106-N may be implemented first.

Third Embodiment

Figure 6:
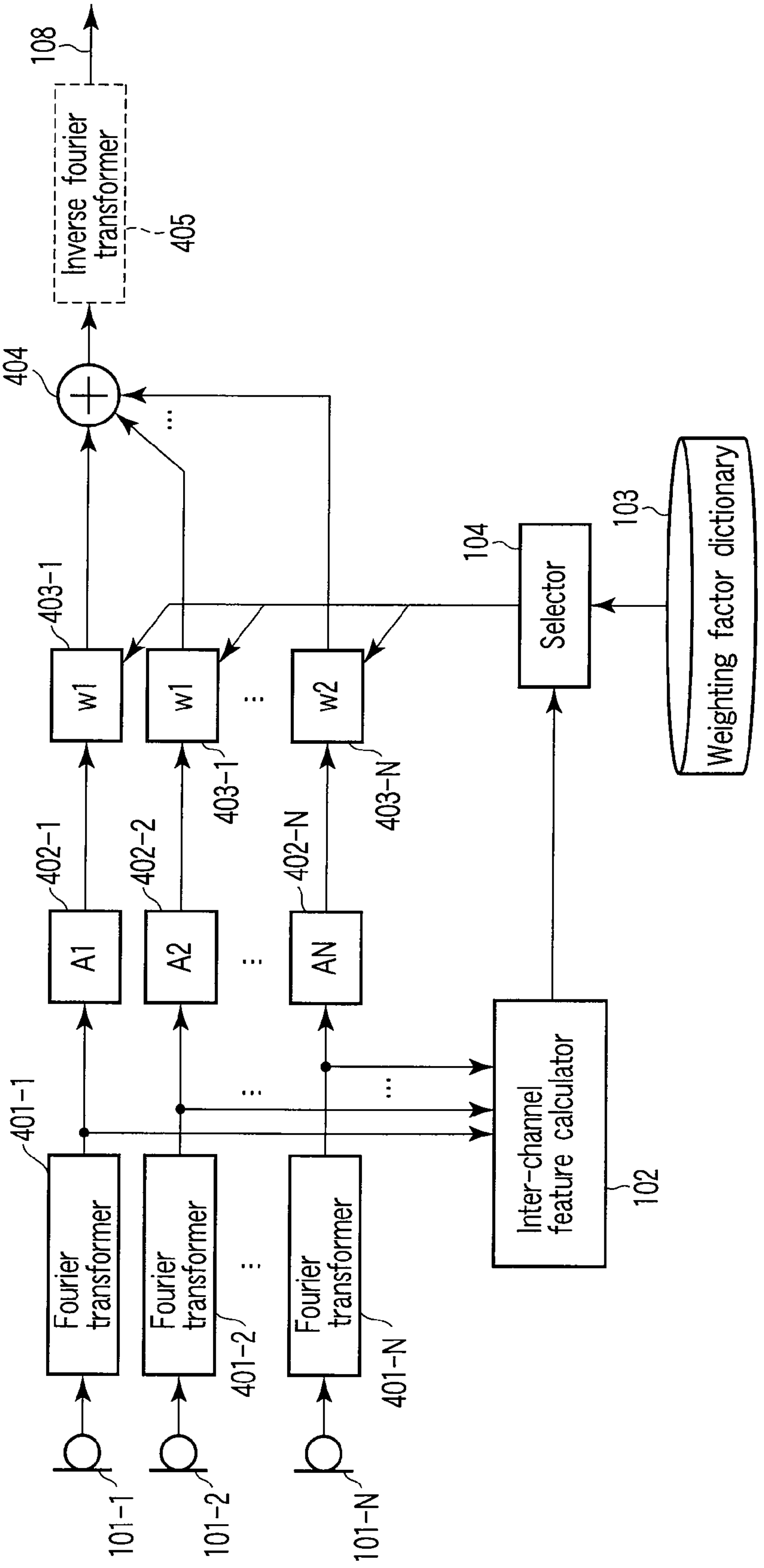
FIG. 6 is a block diagram of an audio signal processor according to a third embodiment.

In the audio signal processing apparatus according to the third embodiment shown in FIG. 6, Fourier transformers 401-1 to 401N for converting the input audio signals of N channels into signals of frequency domain and an inverse Fourier transformer 405 for recovering the audio signals of frequency domain subjected to noise suppression and weighting addition to signals of time domain are added to the first audio signal processing apparatus of FIG. 1 according to the first embodiment. With addition of the Fourier transformers 401-1 to 401N and inverse Fourier transformer 405, the noise suppressors 105-1 to 105-N, the weighting units 106-1 to 106-N and the adder 107 are replaced with noise suppressors 402-1 to 402-N, weighting units 403-1 to 403-N and an adder

404, which perform diffuse noise suppression, weighting and addition, respectively, by arithmetic operation in the frequency domain.

The convolution operation in the time domain is expressed by arithmetic operation of product in the frequency domain as is known in a field of digital signal processing technology. In the present embodiment, the input audio signals of N channels are converted into signals of frequency domain with the Fourier transformers 401-1 to 401N, and then subjected to noise suppression and the weighting addition. The signals subjected to noise suppression and weighting addition are subjected to inverse Fourier transform with the inverse Fourier transformer 405 to be recovered to signals of time domain. Accordingly, the present embodiment executes processing similar to that of the first embodiment for executing processing in the time domain. In this case, the output signal Y(k) from the adder 404 is not expressed by convolution according to the equation (5) but expressed in form of product as following.

$$Y(k) = \sum_{n=1}^{N} xn(k) \times wn(k) \tag{7}$$

where k is a frequency index.

The output audio signal y (t) of time domain can be obtained by subjecting the output signal Y(k) from the adder 404 to inverse Fourier transform with the inverse Fourier transformer 405. The output signal Y(k) of frequency domain from the adder 404 can be just used as a parameter of speech recognition, for example.

When the input audio signal is converted into a signal of frequency domain and then subjected to processing as in the present embodiment, the computation cost may be reduced depending on filter degrees of the weighting units 403-1 to 403-N, and complicated sound reverberation is easy to be expressed, because the processing can be executed for every frequency band.

In the present embodiment, because the inter-channel feature quantity is calculated from the signal before being subjected to noise suppression with the noise suppressors 402-1 to 402-N, the dispersion of distribution of the channel feature quantity by noise suppression is kept to a minimum, and the array processor of rear stage can be functioned effectively.

For the method of noise suppression in the present embodiment, an arbitrary noise suppression method can be selected from various methods such as spectrum sub traction shown in the documents: S. F. Boll, "Suppression of Acoustic Noise in Speech Using Spectral Subtraction," IEEE Trans. ASSP vol. 27, pp. 113-120, 1979, MMSE-STSA shown in the documents: Y. Ephraim, D. Malah, "Speech Enhancement Using a Minimum Mean-Square Error Short-Time Spectral Amplitude Estimator", IEEE Trans. ASSP vol. 32, 1109-1121, 1984, and MMSE-LSA shown in the documents: Ephraim, D. Malah, "Speech Enhancement Using a Minimum Mean-Square Error Log-Spectral Amplitude Estimator", IEEE Trans. ASSP vol. 33, 443-445, 1985 or the improved versions of them appropriately.

Fourth Embodiment

Figure 7:
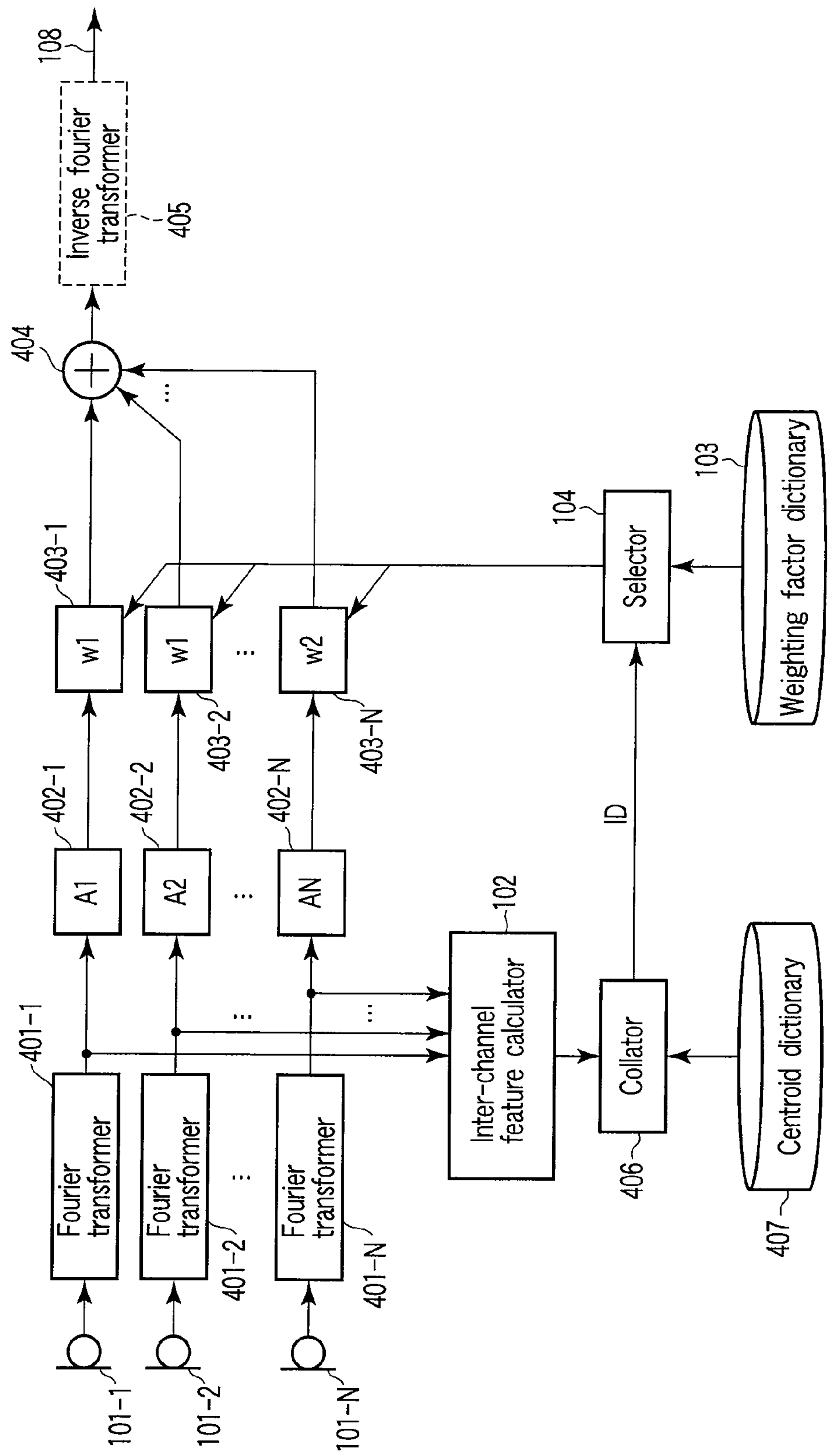
FIG. 7 is a block diagram of an audio signal processor according to a fourth embodiment.
Figure 8:
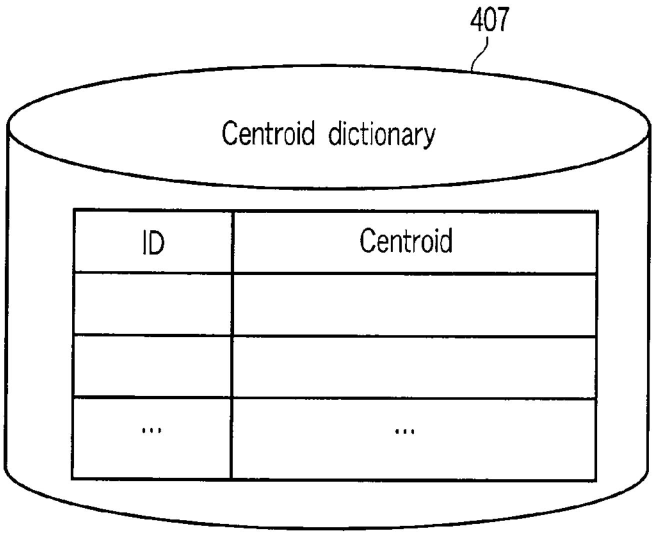
FIG. 8 is a diagram illustrating contents of a centroid dictionary according to FIG. 7.

In an audio signal processing apparatus according to the fourth embodiment of FIG. 7, a collator 501 and a centroid dictionary 502 are added to the audio signal processor of FIG. 4 according to the second embodiment. The centroid dictionary 502 stores feature quantities of a plurality of (I) centroids obtained by LBG method, etc. as shown in FIG. 8 by corresponding to index IDs. The centroid is a representative point of each cluster when clustering the inter-channel feature quantity.

Figure 9:
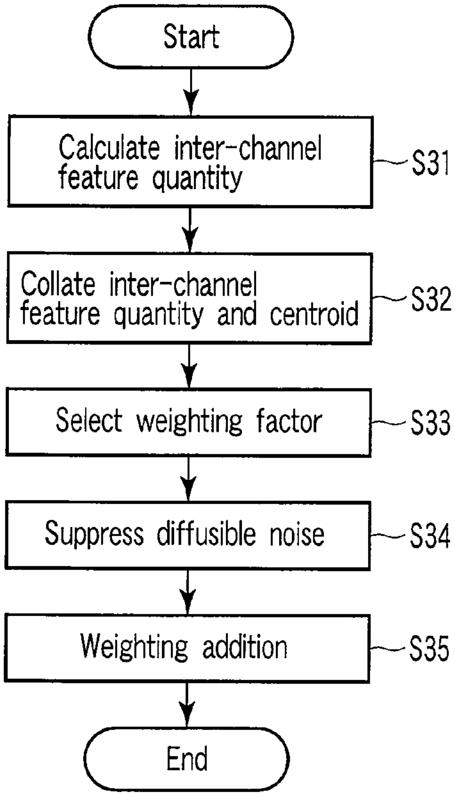
FIG. 9 is a flow chart of a process procedure of the fourth embodiment.

The processing routine of the audio signal processing apparatus of FIG. 7 is shown in the flowchart of FIG. 9. However, in FIG. 9 the processing of Fourier transformers 401-1 to 401N and inverse Fourier transformer 405 are omitted. The inter-channel feature quantities of the Fourier-transformed audio signals of N channels are calculated with the inter-channel feature quantity calculator 102 (step S31). Each inter-channel feature quantity is collated with the feature quantity of each of a plurality of (I) centroids stored in the centroid dictionary 407, and a distance between inter-channel feature quantity and the feature quantity of the centroid is calculated (step S32).

The index ID indicating the feature quantity of the centroid which minimizes the distance between the inter-channel feature quantity and the feature quantity of the representative point is sent from the collator 406 to the selector 104. The weighting factor corresponding to the index ID is selected from the weighting factor dictionary 103 with the selector 104 (step S33). The weighting factor selected with the selector 104 is set to the weighting units 403-1 to 403-N. On the other hand, the input audio signals converted to signals of frequency domain with the Fourier transformers 401-1 to 401N are input to the noise suppressors 402-1 to 402-N to suppress the diffuse noise (step S34).

The audio signals of N channels after noise suppression are weighted according to the weighting factors set to the weighting units 403-1 to 403-N in the step S33. Thereafter, the weighted audio signals are added with the adder 404 to produce an output signal wherein a target signal is emphasized (step S35). The output signal from the adder 404 is subjected to inverse Fourier transform with the inverse Fourier transformer 405 to produce an output audio signal of the time domain.

Fifth Embodiment

Figure 10:
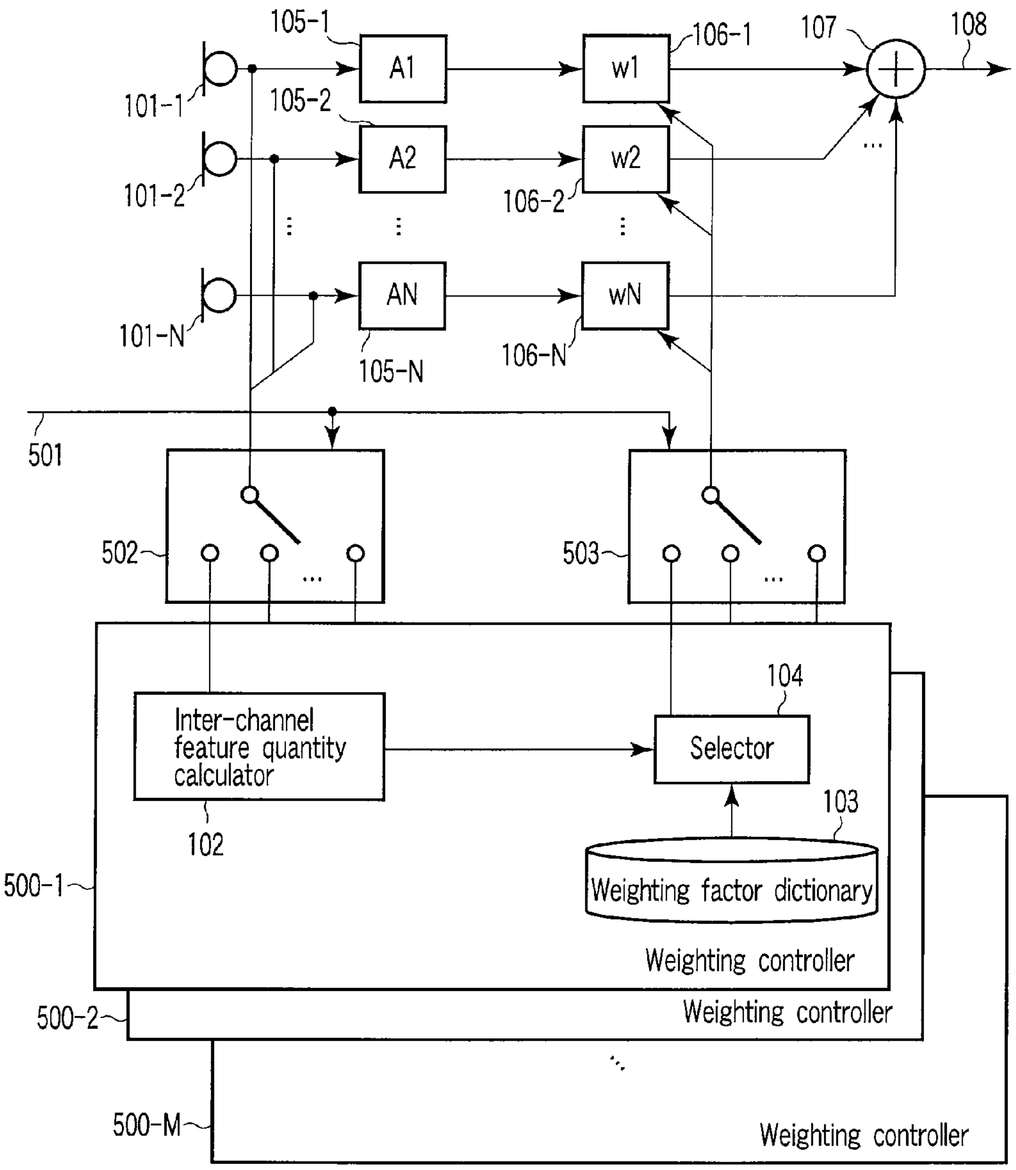
FIG. 10 is a block diagram of an audio signal processor according to a fifth embodiment.

As shown in FIG. 10, the audio signal processing apparatus according to the fifth embodiment is provided with a plurality of (M) weight controllers 500-1 to 500-M each comprising the inter-channel feature quantity calculator 102, weighting factor dictionary 103 and the selector 104 as explained in the first embodiment.

The weight controllers 500-1 to 500-M are switched with an input switch 502 and an output switch 503 according to a control signal 501. In other words, a set of input audio signals of N channels from the microphones 101-1 to 101-N is input to one of the weight controllers 500-1 to 500-M with the input switch 502 to calculate the inter-channel feature quantity with the inter-channel feature quantity calculator 102. In the one of the weight controllers 500-1 to 500-M to which the set of input audio signals is input, the selector 104 selects a set of weighting factors corresponding to the inter-channel feature quantity from the weighting factor dictionary 103. The selected set of weighting factors are input to the weighting units 106-1 to 106-N through the output switch 503.

The audio signals of N channels subjected to noise suppression with the noise suppressors 105-1 to 105-N are weighted by the weighting factor selected with the selector 104 with the weighting units 106-1 to 106-N. The weighted audio signals of N channels from the weighting units 106-1 to 106-N are added with the adder 107 to produce an output audio signal 108 wherein a target speech signal is emphasized.

The weighting factor dictionary 103 is made beforehand by learning in the acoustic environment near actual use environment. In fact, various kinds of acoustic environment are assumed. For example, the acoustic environment of the car interior is different by the type of car greatly. The weighting factor dictionaries 103 of the weight controllers 500-1 to 500-M are learned according to different acoustic environments respectively. Accordingly, when the weight controllers 500-1 to 500-M are switched according to the actual use environment at the time of audio signal processing and the weighting is done using the weighting factor selected with the selector 104 from the weighting factor dictionary 103 learned under the acoustic environment identical or most similar to the actual use environment, the audio signal processing suited to the actual use environment can be executed.

The control signal 501 used for switching the weight controllers 500-1 to 500-M may be generated by the button operation of a user, for example, or automatically using as an index a parameter arisen from the input audio signal such as a SN ratio (SNR). The control signal 501 may be generated as an index an external parameter such as a speed of car.

In the case that the inter-channel feature quantity calculator 102 is provided in each of the weighting controllers 500-1 to 500-M, it is expected to calculate more accurate inter-channel feature quantity by using a method for calculating an inter-channel feature quantity or a parameter, which is suitable for acoustic environment corresponding to each of the weight controllers 500-1 to 500-M.

Sixth Embodiment

Figure 11:
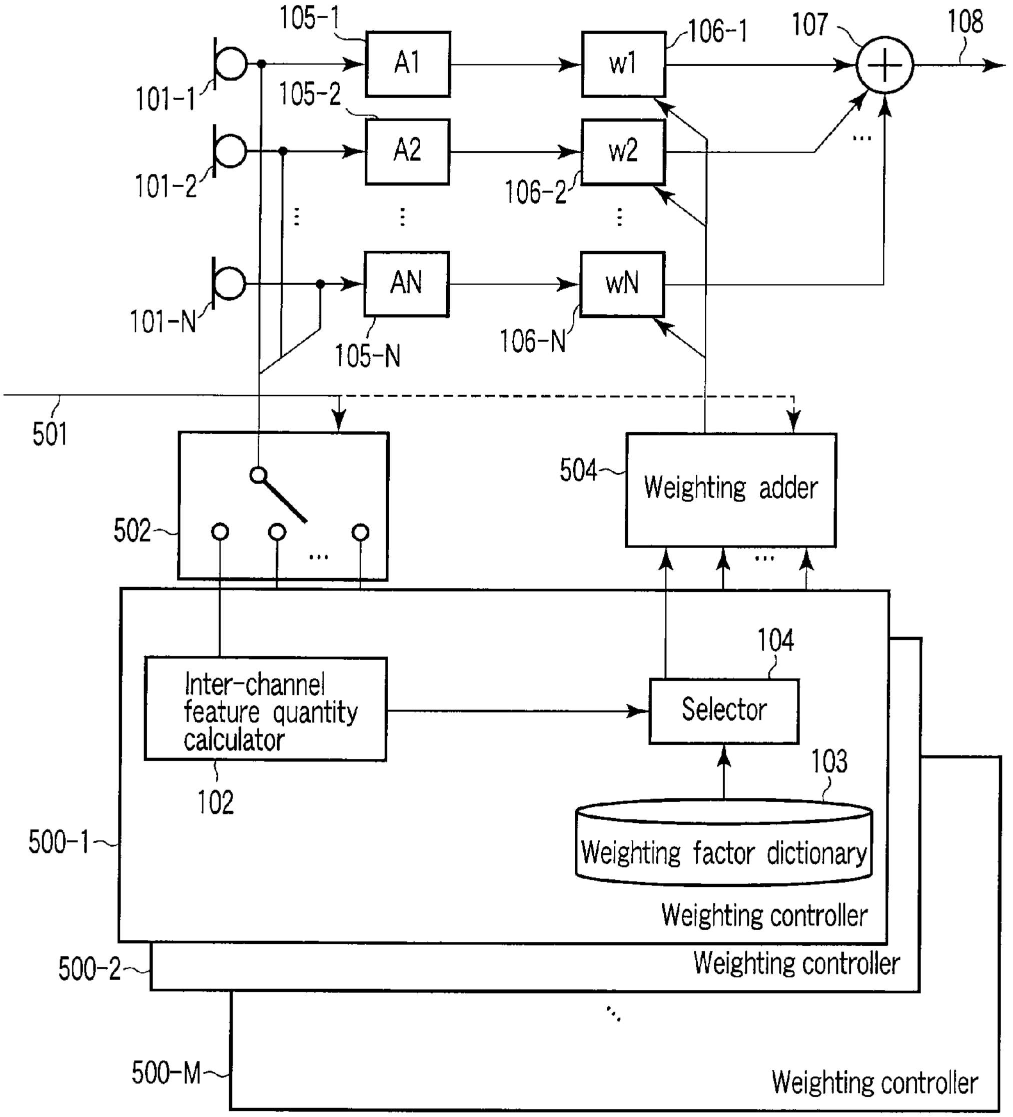
FIG. 11 is a block diagram of an audio signal processor according to a sixth embodiment.

The sixth embodiment shown in FIG. 11 provides an audio signal processing apparatus modifying the fifth embodiment of FIG. 10, wherein the output switch 503 of FIG. 10 is replaced for a weighting adder 504. In a way similar to the fifth embodiment, the weighting factor dictionaries 103 of the weight controllers 500-1 to 500-M are learned under different acoustic environments, respectively.

The weighting adder 504 weighting-adds the weighting factors selected from the weighting factor dictionaries 103 of the weight controllers 500-1 to 500-M by the selectors 104, and feeds the weighting factor obtained by the weighting addition to weighting units 106-1 to 106-N. Accordingly, even if the actual use environment changes, the audio signal processing comparatively adapted to the use environment can be executed. The weighting adder 504 may weight the weighting factor by a fixed weighting factor or a weighting factor controlled on the basis of the control signal 501.

Seventh Embodiment

Figure 12:
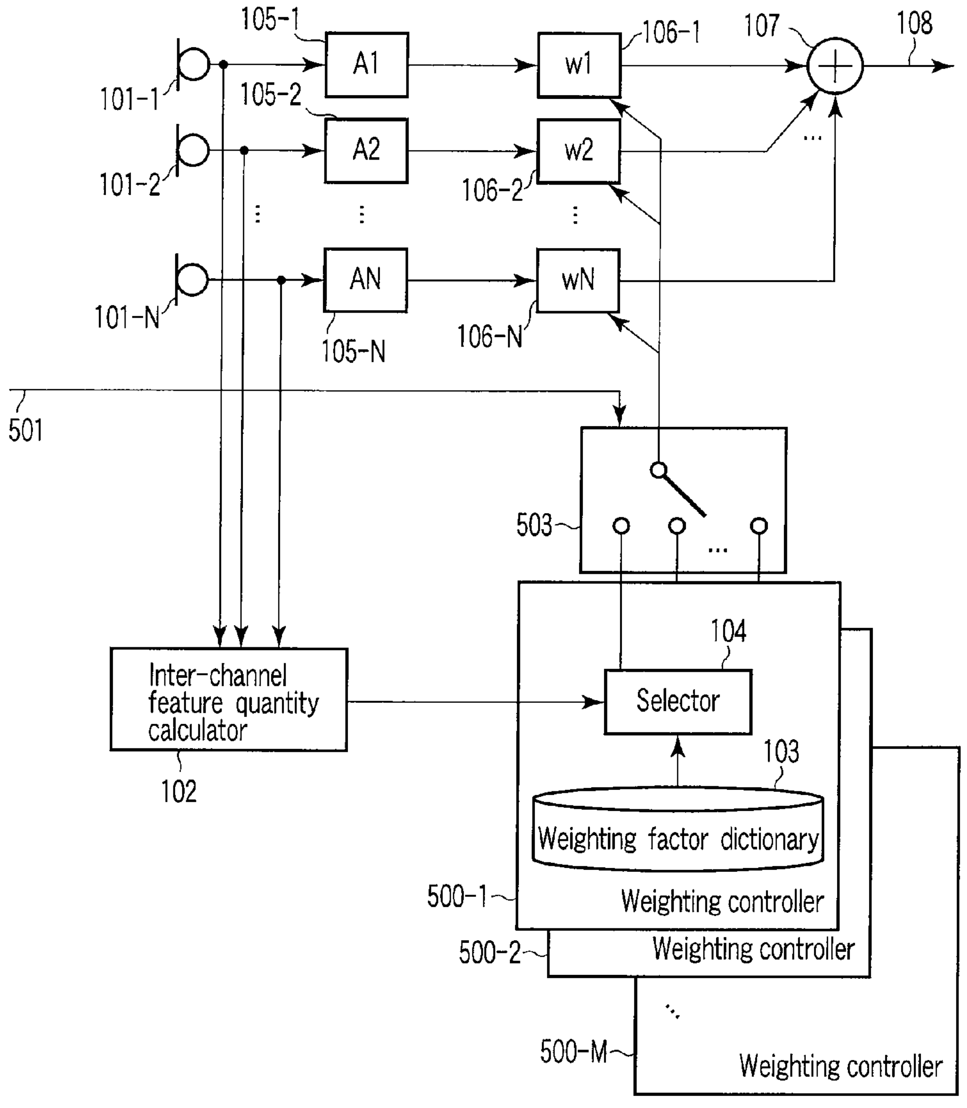
FIG. 12 is a block diagram of an audio signal processor according to a seventh embodiment.

The sixth embodiment shown in FIG. 12 provides an audio signal processing apparatus modifying the fifth embodiment of FIG. 10, wherein the inter-channel feature quantity dictionary is removed from each of the weight controllers 500-1 to 500-M and a common inter-channel feature quantity calculator 102 is used.

In this way, even if a common inter-channel feature quantity calculator 102 is used and only the weighting factor dictionary 103 and selector 104 are changed, an effect approximately similar to the fifth embodiment can be obtained. Further, the sixth and seventh embodiments may be combined, and the output switch 503 of FIG. 12 may be replaced for the weighting adder 504.

Eighth Embodiment

Figure 13:
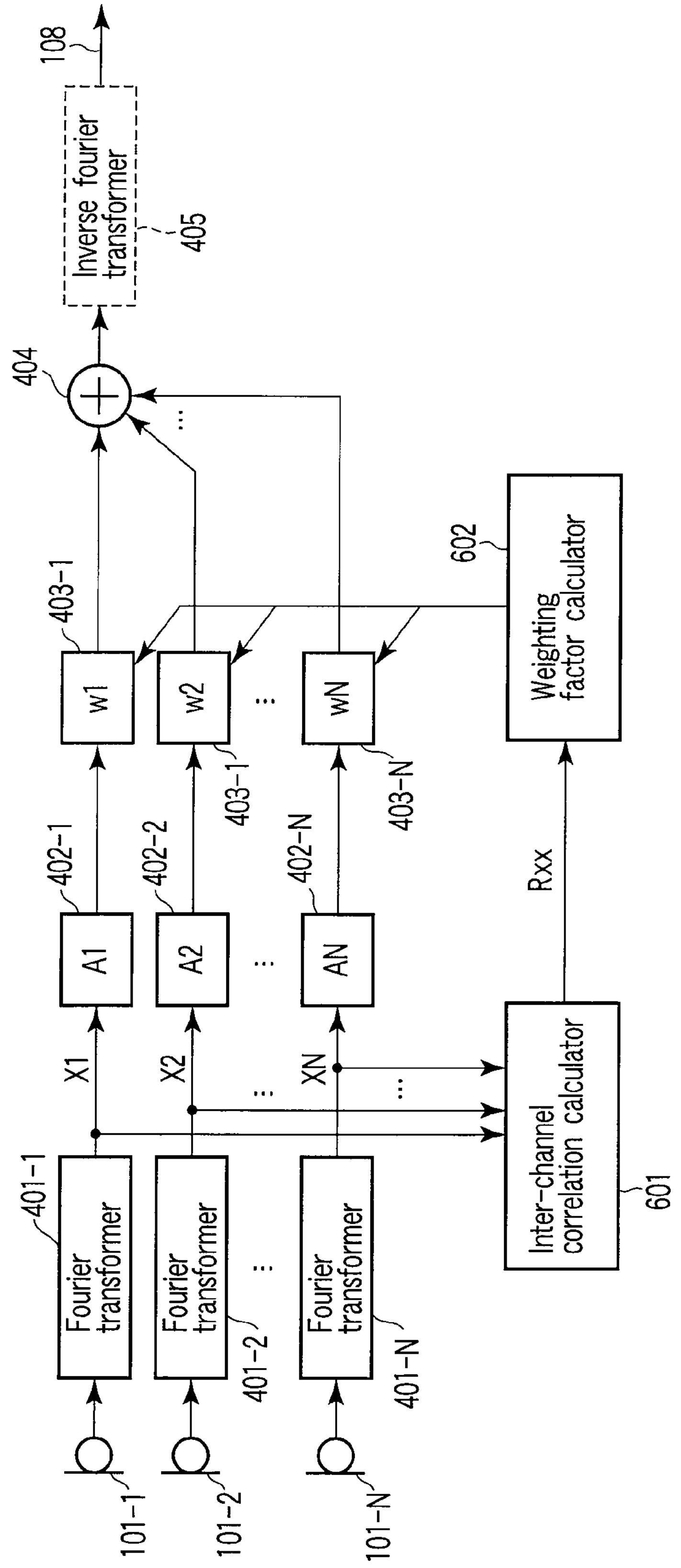
FIG. 13 is a block diagram of an audio signal processor according to a eighth embodiment.

The eighth embodiment shown in FIG. 13 provides an audio signal processing apparatus modifying the third embodiment of FIG. 6, wherein the inter-channel feature quantity calculator 102, weighting dictionary 103 and selector 104 are replaced for an inter-channel correlation calculator 601 and a weighting factor calculator 602.

Figure 14:
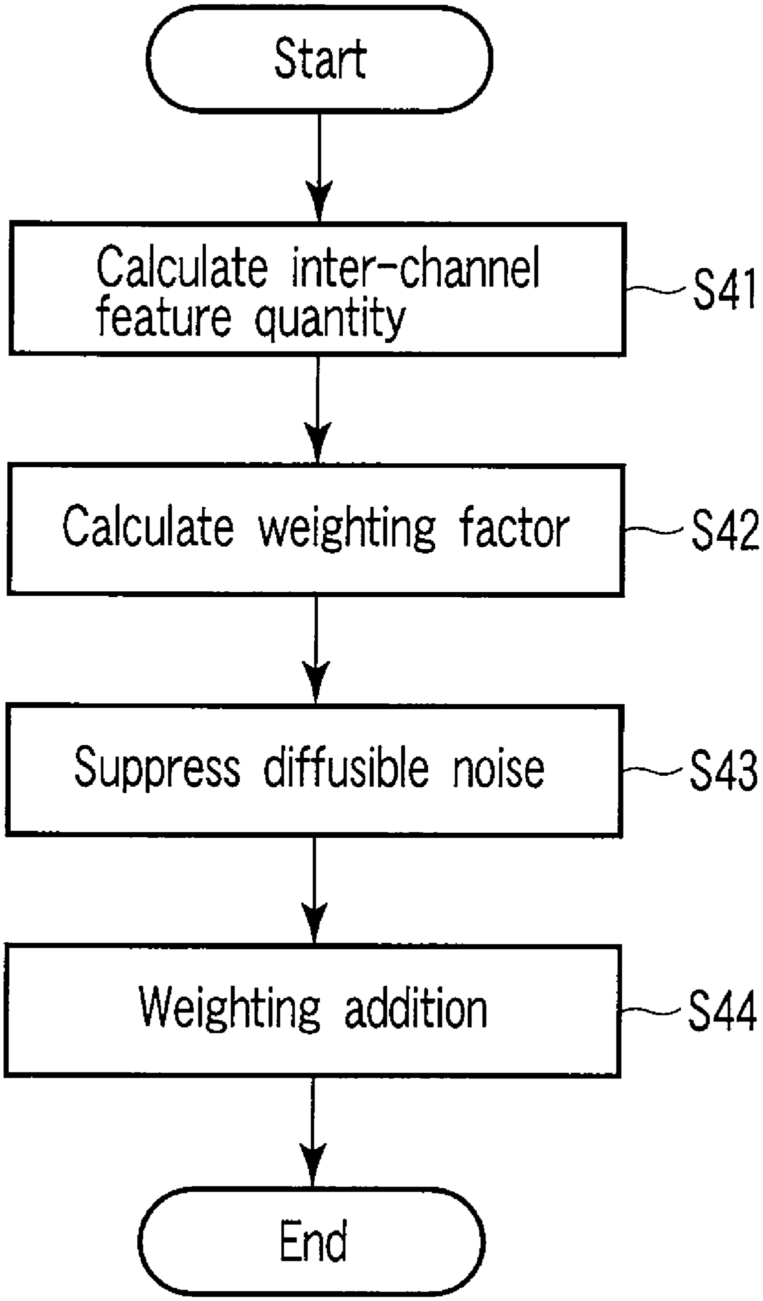
FIG. 14 is a flow chart of a process procedure of the eighth embodiment.

The processing routine of the present embodiment is explained according to the flow chart of FIG. 14. The input audio signals x1 to xN output by the microphones 101-1 to 101-N are subjected to channel correlation calculation with the correlation calculator 601 to obtain channel correlation (step S41). If the input audio signals x1 to xN can be digitized, the channel correlation can be digitized, too.

Weighting factors w1 to wN for forming directivity based on inter-channel correlation calculated in step S41 are calculated with the weighting factor calculator 602 (step S42). The weighting factors w1 to wN calculated by the weighting factor calculator 302 are set to the weighting units 106-1 to 106-N.

The input audio signals x1 to xN are subjected to noise suppression with the noise suppressors 105-1 to 105-N to suppress diffuse noise (step S43). The audio signals of N channels after noise suppression are weighted according to the weighting factors w1 to wN with the weighting units 106-1 to 106-N. Thereafter, the weighted audio signals are added with the adder 107 to obtain an output audio signal 108 wherein a target speech signal is emphasized (step S44).

According to the above-mentioned DCMP which is an example of adaptive array, the weighting factors w given to the weighting units 403-1 to 403-N are calculated in analysis as follows:

$$\begin{aligned} w &= (w1,\, w2,\, \ldots\, ,\, wN)^t \\ &= \frac{(inv(Rxx)c}{(c^h inv(Rxx)c)h} \end{aligned} \tag{8}$$

where Rxx represents an inter-channel correlation matrix, inv represents an inverse matrix, and h represents a conjugate transpose matrix. The vector c is referred to as a constrained vector. A design is possible so that the response in a direction indicated by the vector c becomes a desired response h (response having directivity in a direction of a target speech). Each of w and c is a vector, and h is a scalar. It is possible to set a plurality of constrained conditions. In this case, c is a matrix, and h is a vector. Usually, the constrained vector is assumed to be a target speech direction and an desired response is designed to 1.

The DCMP can obtain the weighting factor in analysis based on an input signal. However, in the present embodiment, the input signals of the weighting units 403-1 to 403-N are output signals of the noise suppressors 402-1 to 402-N, and the input signal of the inter-channel correlation calculator 601 used for calculating the weighting factor is an input signal of the noise suppressors 402-1 to 402-N. Because both do not coincide, theoretical mismatching occurs.

Under normal circumstances, the inter-channel correlation should be calculated using a noise-suppressed signal, but according to the present embodiment there is a merit that the inter-channel correlation can be calculated early. Therefore, the present embodiment may show high performance in total depending on conditions of use. The technique described in the first to seventh embodiments learns the weighting factor by pre-learning containing contribution of the noise suppressor, so that the above-mentioned mismatching does not occur.

In the present embodiment, DCMP is used as an example of the adaptive array, but the array of other types such as a Griffiths-Jim type described by L. J. Griffiths and C. W. Jim, "An Alternative Approach to Linearly Constrained Adaptive Beamforming," IEEE Trans. Antennas Propagation, vol. 0, No. 1, pp. 27-34, 1982, the entire contents of which are incorporated herein by reference, may be used.

Ninth Embodiment

Figure 15:
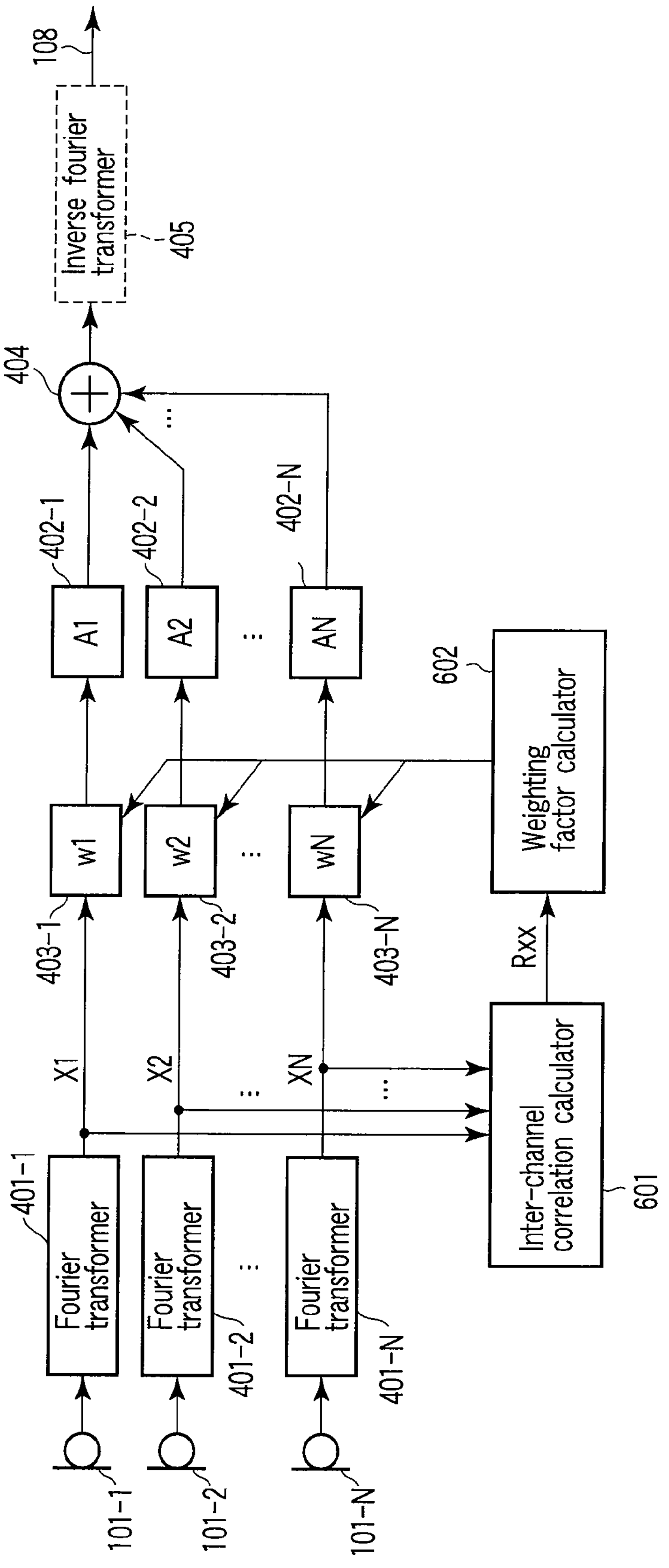
FIG. 15 is a block diagram of an audio signal processor according to a ninth embodiment.
Figure 16:
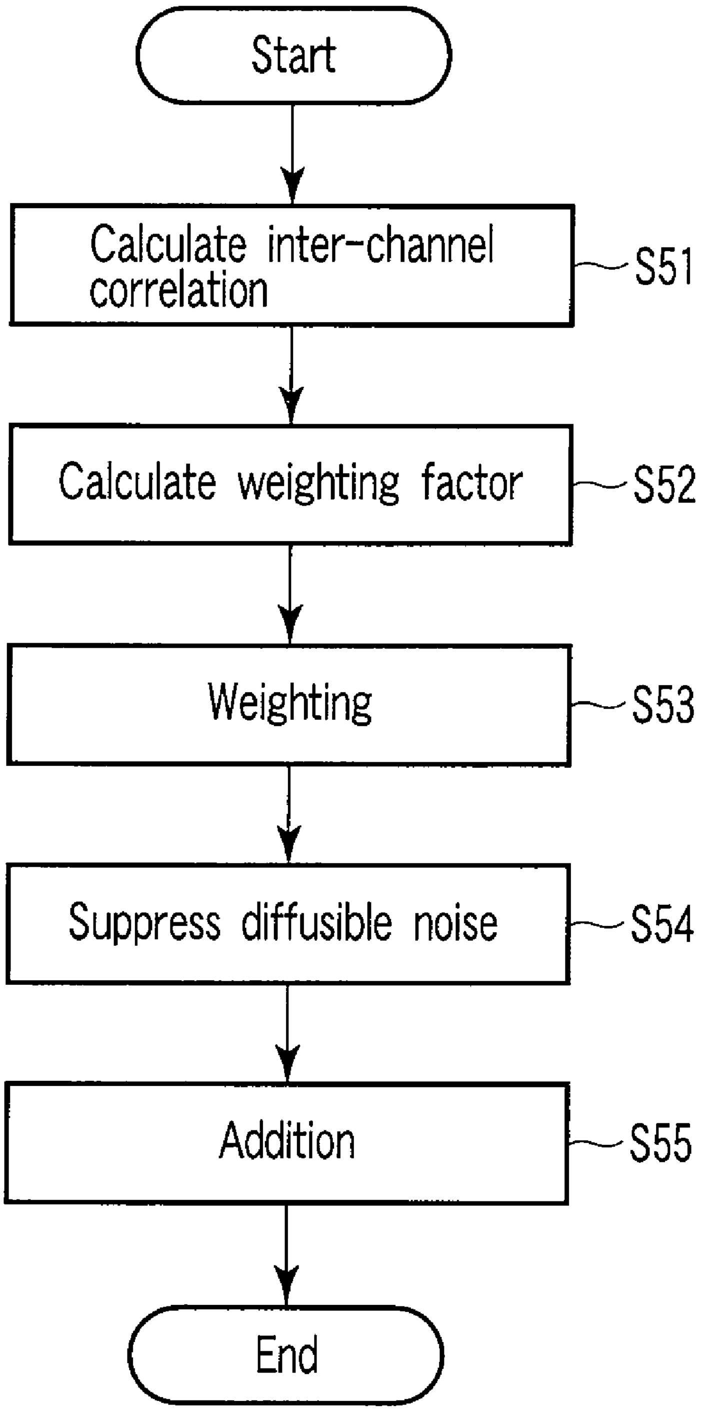
FIG. 16 is a flow chart of a process procedure of the ninth embodiment.

The ninth embodiment shown in FIG. 15 provides an audio signal processing apparatus modifying the eighth embodiment of FIG. 13, wherein the noise suppressors 105-1 to 105-N and the weighting units 106-1 to 106-N are replaced with each other. In other words, as shown in the flow chart of FIG. 16, an inter-channel correlation quantity of the input audio signals x1 to xN of N channels is calculated with the inter-channel correlation calculator 601 (step S51). The weighting factors w1 to wN for forming directivity are calculated based on the calculated inter-channel correlation with the weighting factor calculator 602 (step S52). The weighting factors w1 to wN calculated by the weighting factor calculator 302 are set to the weighting units 106-1 to 106-N. In this way, steps S51 and S52 are similar to steps S41 and S42 of FIG. 14.

In the present embodiment, the weighting is done for the input audio signals x1 to xN with weighting units 106-1 to 106-N (step S53). The weighted audio signals of the N channels are subjected to noise suppression to suppress diffuse noise with the noise suppressors 105-1 to 105-N (step S54). At last, the noise-suppressed audio signals of N channels are added with the adder 107 to provide an output audio signal 108 (step S55).

In this way, which of a set of noise suppressors 105-1 to 105-N and a set of weighting units 106-1 to 106-N may be executed first.

The audio signal processing explained in the first to ninth embodiments can be executed by using, for example, a general purpose computer as basis hardware. In other words, the above mentioned audio signal processing can be realized by making a processor mounted in the computer carry out a program. In this time, the audio signal processing may be realized by installing the program in the computer beforehand. Also, the program may be stored in a recording medium such as CD-ROM or distributed through a network and installed into the computer appropriately.

According to the present invention, the target speech can be emphasized while removing a diffuse noise. Further, since the feature quantity representing a difference between channels of the input audio signals or channel correlation is calculated with respect to the input audio signal before noise reduction, even if the processing of noise reduction is executed independently for every channel, the feature quantity between channels or correlation between the channels are maintained. Accordingly, the operation for emphasizing a target speech by the learning type microphone array is assured.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An audio signal processing method for processing input audio signals of plural channels, comprising:

calculating, by an audio signal processor, at least one feature quantity representing a difference between channels of input audio signals;

selecting, by the audio signal processor, at least one weighting factor according to the feature quantity from at least one weighting factor dictionary prepared by learning beforehand; and subjecting, by the audio signal processor, the input audio signals of plural channels to signal processing, including noise suppression and weighting addition using the selected weighting factor, to generate an output audio signal, wherein the selecting includes calculating a distance between the feature quantity and a feature quantity of each of a plurality of centroids prepared beforehand to obtain a plurality of distances, and determining one centroid to which the distance is minimum relative to the plurality of distances, and the weighting factor corresponding to each of the plurality of centroids prepared beforehand.

2. The method according to claim 1, wherein subjecting the input audio signals to the signal processing includes performing the noise suppression on the input audio signals of plural channels, and weighting-adding the audio signals subjected to the noise suppression.

3. The method according to claim 1, wherein subjecting the input audio signals to the signal processing includes weighting the input audio signals of plural channels using the weighting factor, subjecting the weighted audio signals of plural channels to the noise suppression, and adding the audio signals of plural channels, which were subjected to the noise suppression.

4. The method according to claim 1, wherein the weighting factor corresponds to the feature quantity beforehand.

5. The method according to claim 1, wherein the calculating includes calculating an arrival time difference between the channels of the input audio signals.

6. The method according to claim 1, wherein the calculating includes calculating complex coherence between the channels of the input audio signals.

7. The method according to claim 1, wherein the calculating includes calculating a power ratio between the channels of the input audio signals.

8. The method according to claim 1, wherein the weighting factor corresponds to a filter coefficient of time domain, and the weighting is performed by convolution of the audio signal and the weighting factor.

9. The method according to claim 1, wherein the weighting factor corresponds to a filter coefficient of frequency domain and the weighting is performed by calculating a product of the audio signal and the weighting factor.

10. The method according to claim 1, wherein the weighting factor dictionary is selected according to acoustic environment.

11. An audio signal processing apparatus for processing audio signals of plural channels, comprising:

a calculator to calculate at least one feature quantity representing a difference between channels of input audio signals;

a selector to select at least one weighting factor from at least one weighting factor dictionary according to the feature quantity; and a signal processor to subject the audio signals of plural channels to signal processing including noise suppression and weighting addition using the selected weighting factor to generate an output audio signal, wherein the selector includes a calculator for calculating a distance between the feature quantity and a feature quantity of each of a plurality of centroids prepared beforehand to obtain a plurality of distances, and determining one centroid to which the distance is minimum relative to the plurality of distances, and the weighting factor corresponding to each of the plurality of centroids prepared beforehand.

12. A non-transitory computer readable storage medium storing instructions of a computer program which when executed by a computer results in performance of steps comprising:

calculating at least one feature quantity representing a difference between channels of input audio signals;

selecting at least one weighting factor according to the feature quantity from at least one weighting factor dictionary prepared by learning beforehand; and subjecting the input audio signals of plural channels to signal processing including noise suppression and weighting addition using the selected weighting factor to generate an output audio signal, wherein the selecting includes calculating a distance between the feature quantity and a feature quantity of each of a plurality of centroids prepared beforehand to obtain a plurality of distances, determining one centroid to which the distance is minimum relative to the plurality of distances, and the weighting factor corresponding to each of the plurality of centroids prepared beforehand.

* * * * *